(12) United States Patent
Fukawatase et al.

(10) Patent No.: US 7,681,908 B2
(45) Date of Patent: Mar. 23, 2010

(54) KNEE AIRBAG DEVICE

(75) Inventors: Osamu Fukawatase, Nishikamo-gun (JP); Tomoyuki Moro, Toyota (JP); Kenji Imamura, Kosai (JP); Akiyoshi Sanada, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 124 days.

(21) Appl. No.: 11/984,877

(22) Filed: Nov. 23, 2007

(65) Prior Publication Data

US 2008/0122204 A1    May 29, 2008

(30) Foreign Application Priority Data

Nov. 24, 2006 (JP) ............................. 2006-317353

(51) Int. Cl.
*B60R 21/215* (2006.01)
*B60R 21/203* (2006.01)

(52) U.S. Cl. .................. 280/728.3; 280/731; 280/752; 280/730.1

(58) Field of Classification Search .............. 280/728.3, 280/730.1, 731, 752
See application file for complete search history.

(56) References Cited

U.S. PATENT DOCUMENTS

| | | | |
|---|---|---|---|
| 5,533,748 A * | 7/1996 | Wirt et al. | ................ 280/728.3 |
| 5,570,901 A | 11/1996 | Fyrainer | |
| 6,942,245 B2 | 9/2005 | Takimoto et al. | |
| 2003/0178819 A1 * | 9/2003 | Schneider et al. | ........ 280/728.3 |
| 2005/0156424 A1 * | 7/2005 | Muller | ....................... 280/777 |

FOREIGN PATENT DOCUMENTS

| | | |
|---|---|---|
| JP | A-3-5257 | 1/1991 |
| JP | A-09-104317 | 4/1997 |
| JP | B2-2759065 | 3/1998 |
| JP | A-2002-037003 | 2/2002 |
| JP | B2-3752920 | 12/2005 |
| JP | B2-3760424 | 1/2006 |
| WO | WO 02/04261 A1 | 1/2002 |

* cited by examiner

*Primary Examiner*—Paul N. Dickson
*Assistant Examiner*—Timothy Wilhelm
(74) *Attorney, Agent, or Firm*—Oliff & Berridge, PLC

(57) ABSTRACT

A knee airbag device includes an airbag module and an airbag door. The airbag module includes a gas generation device that is operated when the knee airbag device is operated, and a knee airbag that is stored in a folded state inside a column cover that covers the rear end portion of a steering column. When the knee airbag receives gas from the gas generation device, the knee airbag is inflated and deployed toward the knee of an occupant. The airbag door, provided in the lower portion of the column cover, is made of a flexible material. When the knee airbag is inflated and deployed, the airbag door is opened toward the knee of the occupant due to an airbag inflation pressure.

3 Claims, 4 Drawing Sheets

KNEE AIRBAG DEVICE

INCORPORATION BY REFERENCE

The disclosure of Japanese Patent Application No. 2006317353 filed on Nov. 24, 2006 including the specification, drawings and abstract is incorporated herein by reference in its entirety.

BACKGROUND OF THE INVENTION

1. Field of the Invention

The invention relates to a knee airbag device that includes a knee airbag that is inflated and deployed from a column cover for a steering column to restrain the knees of an occupant, when a collision occurs.

2. Description of the Related Art

Various knee airbag devices have been proposed to protect the knee portion of an occupant. For example, Japanese Patent Application Publication No. 2002-37003 (JP-A-2002-37003) describes a knee airbag device in which an airbag module is disposed inside a column cover for a steering column. In the knee airbag device, a tear portion formed in the column cover is torn by an airbag inflation pressure, and thus, an airbag door is opened. A knee airbag is inflated and deployed from an opening formed by opening the airbag door, to restrain the knees of the occupant.

However, in the above-described knee airbag device, because the column cover is made of a relatively rigid resin material, the airbag door may strongly press the knees of the occupant when the knee airbag is inflated and deployed. Accordingly, in view of this, the above-described knee airbag device needs to be improved.

SUMMARY OF THE INVENTION

The invention provides a knee airbag device that reduces strength of a force by which an airbag door presses the knees of an occupant when a knee airbag is inflated and deployed.

A first aspect of the invention relates to a knee airbag device that includes an airbag module and an airbag door. The airbag module includes a gas generation device that is operated when the knee airbag device is operated, and a knee airbag that is stored in a folded state inside a column cover that covers the rear end portion of a steering column. When the knee airbag receives gas from the gas generation device, the knee airbag is inflated and deployed toward the knee of an occupant. The airbag door, provided in the lower portion of the column cover, is made of a flexible material. When the knee airbag is inflated and deployed, the airbag door is opened toward the knee of the occupant due to an airbag inflation pressure. According to a second aspect of the invention, the airbag door, provided in the lower portion of the column cover, is made of a material that is more flexible than a material of which the column cover is made.

According to the above-described aspect, when a collision occurs, the gas generation device is operated to generate gas. The gas flows into the knee airbag that is stored in the folded state inside the column cover that covers the rear end portion of the steering column. Thus, the knee airbag is inflated. Accordingly, the airbag inflation pressure is applied to the airbag door provided in the lower portion of the column cover, and thus, the airbag door is opened. As a result, the knee airbag is inflated and deployed toward the knees of the occupant, and protects the knees of the occupant.

In the above-described aspect, the airbag door, provided in the column cover, is made of a flexible material. Therefore, if the airbag door, which receives the airbag inflation pressure, is opened, and the airbag door hits the knees of the occupant, the airbag door flexibly bends, and does not strongly press the knees of the occupant.

In the above-described aspect, the airbag door may cover an opening that is formed in the lower wall and that extends from the right wall to the left wall of the column cover, and through which the knee airbag protrudes. A tear portion may be formed in the airbag door, and the tear portion may be torn when the airbag inflation pressure applied to the airbag door reaches a predetermined value.

According to the above-described aspect, the opening, through which the knee airbag protrudes, is formed in the lower wall and extends from the right wall to the left wall. The airbag door covers the opening. Further, the tear portion is formed in the airbag door, and the tear portion is torn when the airbag inflation pressure applied to the airbag door reaches a predetermined value. Thus, the airbag door is opened.

Because a gap between the knees of the occupant and a portion near the column cover is generally narrow, the knee airbag needs to be quickly inflated and deployed in the vehicle-width direction when a frontal collision occurs. Therefore, it is preferable that the opening, through which the knee airbag protrudes, be formed in the lower wall and extends from the right wall to the left wall of the column cover. However, when the airbag door is formed to cover the opening extending from the right wall to the left wall, the shape of the opened airbag door tends to be long in the vehicle-width direction. As a result, the airbag door is likely to hit the knees of the occupant. However, in this aspect of the invention, because the airbag door is made of a flexible material, the airbag door does not strongly press the knees of the occupant if the airbag door hits the knees of the occupant.

In the above-described aspect, the airbag door may be made of cloth, and the base end portion of the airbag door may be integrally fixed to the column cover at a peripheral portion around the opening, through which the knee airbag protrudes.

Further, in the above-described aspect, the base end portion of the airbag door may be integrally fixed to the column cover at the peripheral portion by embedding the base end portion of the airbag door in the peripheral portion by insert molding.

In the above-described aspect, the airbag door may be made of cloth, i.e., a material that is different from a material of which the column cover is made. Therefore, fixing means for fixing the airbag door to the column cover is generally required, because different materials are joined together. However, according to the aspect of the invention, because the base end portion of the airbag door is embedded in the peripheral portion around the opening by insert molding, the resin moves to, and firmly attaches to the base end portion of the airbag door, when the column cover is formed using resin. Accordingly, it is possible to ensure the strength for supporting the airbag door, without providing, for example, special fixing means for fixing the airbag door.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein.

DETAILED DESCRIPTION OF THE EMBODIMENTS

Hereinafter a knee airbag device for a vehicle according to an embodiment of the invention will be described with reference to FIG. 1 to FIG. 4. In FIG. 1 to FIG. 4, the arrow FR indicates the front of a vehicle. The arrow UP indicates the top of the vehicle. The arrow IN indicates the inside of the vehicle in a vehicle-width direction.

Figure 1:
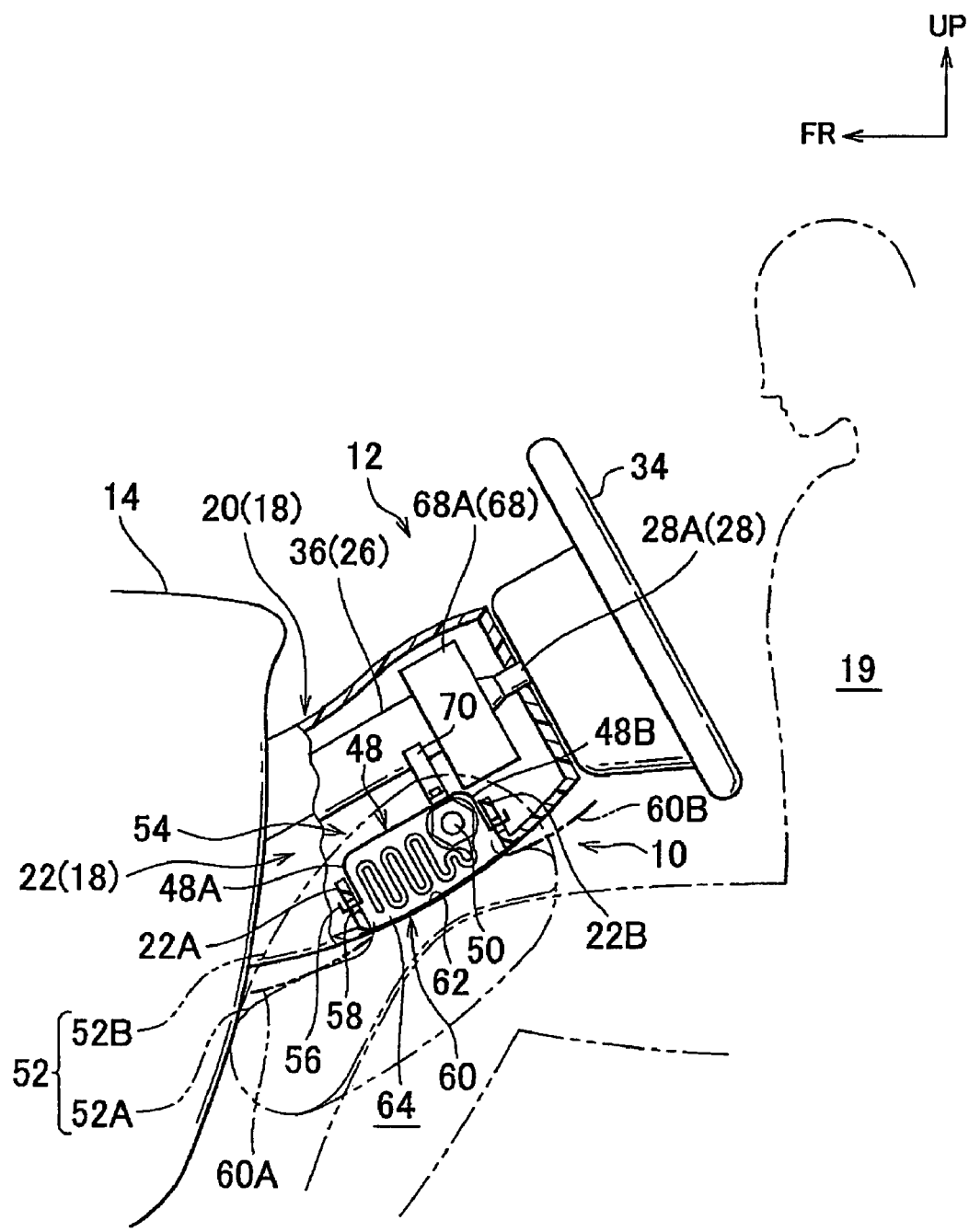
FIG. 1 is a longitudinal cross section showing the entire configuration of a knee airbag device according to an embodiment in a lateral view.
Figure 2:
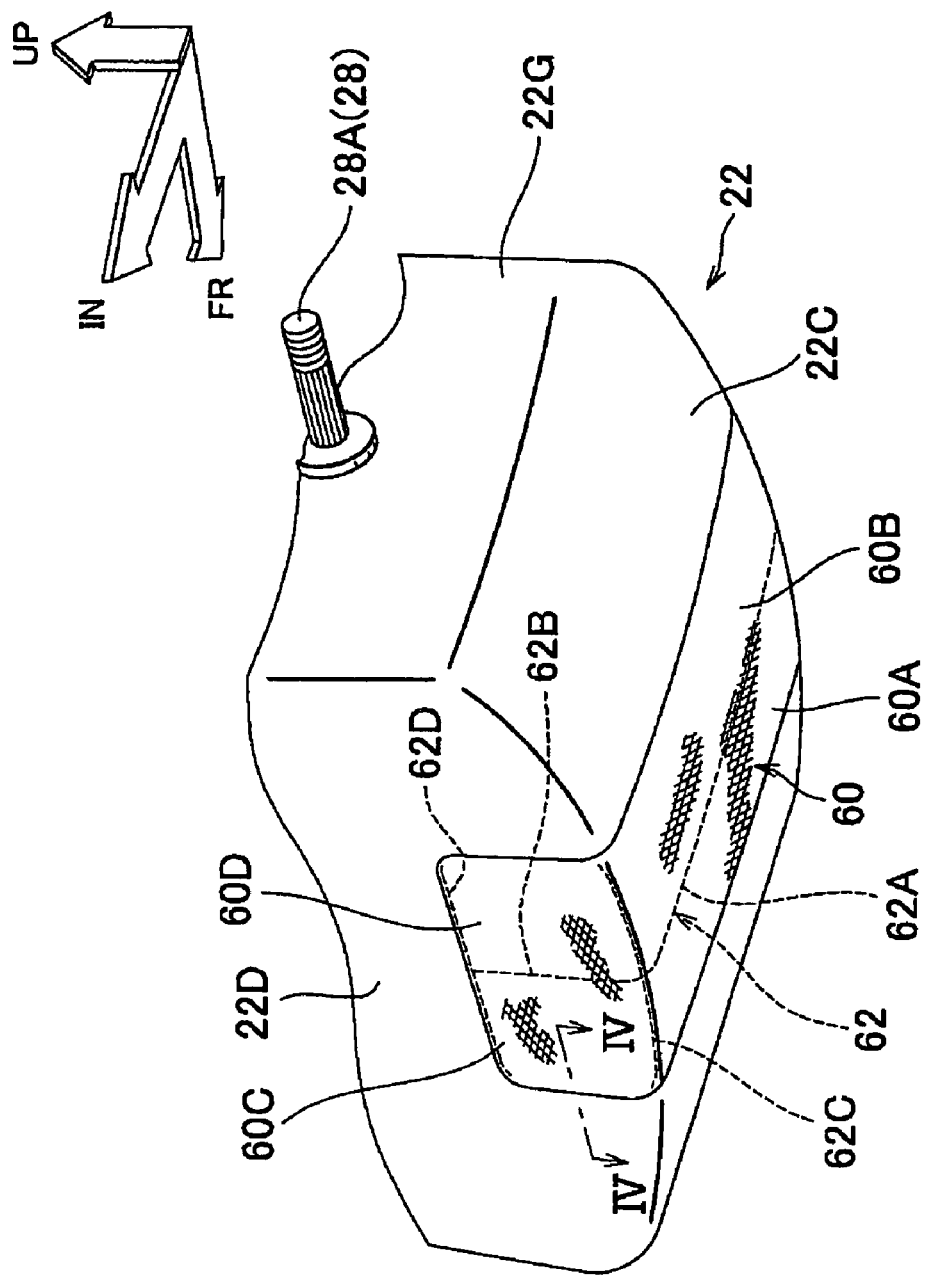
FIG. 2 is an enlarged perspective view showing a column lower cover shown in FIG. 1 when an airbag door is closed.

FIG. 1 is a longitudinal cross sectional view showing the entire configuration of a knee airbag device 10 according to the embodiment FIG. 2 is an enlarged perspective view showing the main portion of the knee airbag device 10.

As shown in FIG. 1 and FIG. 2, an opening portion is formed in a portion of an instrument panel 14, which faces a driver seat. A steering column 12 is inserted through the opening portion such that the steering column 12 is inclined downward toward the front of the vehicle. The column cover 18 covers the rear end portion of the steering column 12, which protrudes toward a vehicle cabin 19 from the opening portion of the instrument panel 14. The column cover 18 is divided into two portions, i.e., an upper portion and a lower portion. More specifically, the column cover 18 includes a column upper cover 20 and a column lower cover 22.

Only elements of the steering column 12, which are related to the knee airbag device 10 according to the embodiment, will be described. The steering column 12 includes a cylindrical column tube 26. A steering main shaft 28 is rotatably supported at the core of the column tube 26. The steering main shaft 28 is divided into two portions in the direction of the axis of the steering column 12. That is, the steering main shaft 28 includes an upper shaft 28A and a lower shaft (not shown). The upper shaft 28A is spline-fitted to the lower shaft. Accordingly, the upper shaft 28A is movable with respect to the lower shaft in a predetermined stroke. However, the upper shaft 28A is not rotatable with respect to the lower shaft. A steering wheel 34 is fixed at the rear end of the upper shaft 28A using a lock nut. A driver applies steering force to the steering wheel 34.

The column tube 26, which covers the steering main shaft 28, is also divided into two portions in the direction of the axis of the steering column 12, i.e., the column tube 26 has a double-tube structure. That is, the column tube 26 includes an inner tube 36 disposed close to an occupant, and an outer tube (not shown) disposed opposite to the occupant (i.e., disposed close to a steering gear box). The inner tube 36 is spline-fitted to the outer tube. The diameter of the outer tube is larger than the diameter of the inner tube 36. When a secondary collision occurs between the occupant and the steering wheel 34, the inner tube 36 slides into the outer tube so that the column tube 26 is contracted. Further, the outer tube is supported by an instrument panel reinforce (not shown), which is formed into a pipe. The instrument panel reinforce has high strength and high rigidity, and extends along the vehicle-width direction in the instrument panel 14.

Next, the entire configuration of the knee airbag device 10 according to the embodiment will be described.

The knee airbag device 10 includes an airbag module 54 and an airbag door 60. The airbag module 54 includes a module case 48, an inflator 50, and a knee airbag 52. The module case 48, which has a substantially box shape, is made of metal. The lower portion of the module case 48 is open. The inflator 50, which has a substantially cylindrical shape, is housed in the module case 48 at a rear end portion. The inflator 50 may be regarded as the gas generation device. The knee airbag 52 is stored in the folded state inside the module case 48 at a front end portion. The airbag door 60 covers the opening of the module case 48.

A plurality of hook portions 56 are formed at predetermined intervals in each of the front wall portion 48A and the rear wall portion 48B of the module case 48. The hook portions 56 are formed by bending the portions of the front wall portion 48A and the rear wall portion 48B. In this regard, a front wall portion 22A and a rear wall portion 22B are disposed on the inner surface of the column lower cover 22 (i.e., the surface that faces the inner tube 36) at a predetermined interval in the direction of the axis of the steering column 12. The front wall portion 22A and the rear wall portion 22B stand toward the inner tube 36. Engagement holes 58 are formed in each of the front wall portion 22A and the rear wall portion 22B. The hook portions 56 are engaged with the respective engagement holes 58. As a result, the airbag module 54 is located so that the open side of the module case 48 is covered.

Although the airbag door 60 will be described in detail later, the airbag door 60 is provided between the front wall portion 22A and the rear wall portion 22B of the column lower cover 22. When the airbag door 60 is torn along the tear line (break portion) 62 described later, the airbag door 60 is opened toward the front and rear and right and left. The tear line 62 is formed by forming slits, and may be regarded as "the tear portion".

In FIG. 1, the knee airbag 52 is accordion-folded. However, the knee airbag 52 does not necessarily need to be accordion-folded. The knee airbag 52 may be rolled up. Alternatively, the knee airbag 52 may be partly accordion-folded and partly rolled up. Further, the shape of the deployed knee airbag 52 will be supplementarily described. A center portion 52A that is inflated below the steering column 12 is relatively thin, because there is the column lower cover 22 below the steering column 12. Right and left portions 52B that are inflated on the sides of the steering column 12 are relatively thick, because the right and left portions 52B are inflated between the instrument panel 14 and the both knee portions of the occupant.

The airbag module 54 is disposed below the rear end portion of the inner tube 36 of the column tube 26. More specifically, the main body portion 68A of a combination switch 68, which has a ring shape, is disposed at the rear end portion of the inner tube 36. The airbag module 54 is fitted to the inner tube 36 at a position adjacent to the main body portion 68A through an attachment bracket 70.

Next, the configuration of the main portion of the lower column cover 22 will be described.

Figure 3:
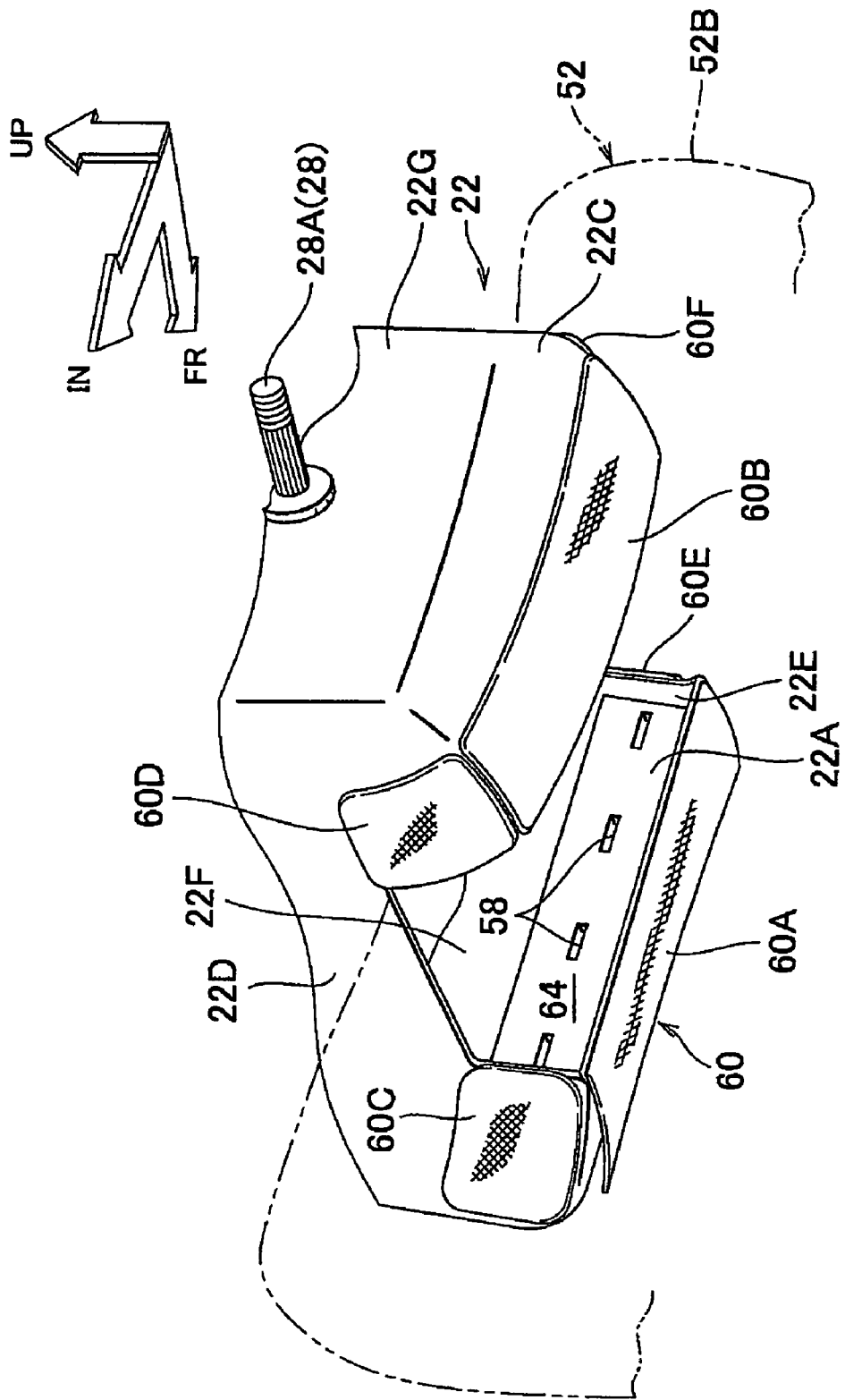
FIG. 3 is a perspective view associated with FIG. 2, which shows the column lower cover when the airbag door, which has been closed as shown in FIG. 2, is torn, and opened toward the front and rear, and right and left.
Figure 4:
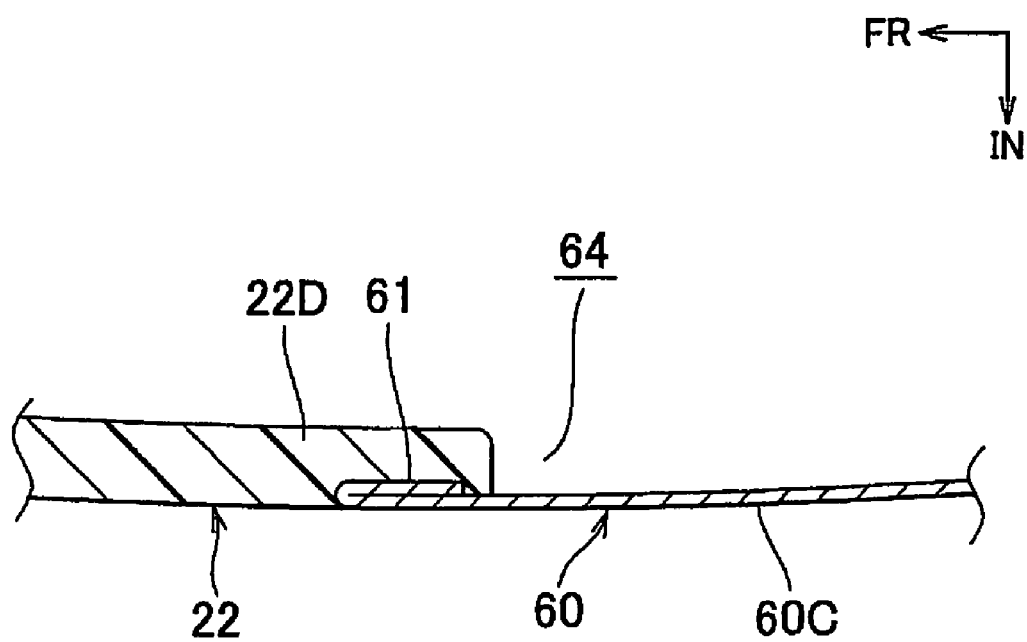
FIG. 4 is an enlarged cross sectional view taken along line IV-IV in FIG. 2.

As shown in FIG. 2 to FIG. 4, the column lower cover 22, to which the airbag door 60 is fixed, has a substantially box shape. The upper portion of the column lower cover 22 is open. The column lower cover 22 includes a lower wall 22C, a pair of right and left walls 22E and 22D (refer to FIG. 3), a front wall 22F, and a rear wall 22G. The lower wall 22C is positioned below the steering column 12. In the lateral view, the lower wall 22C is gradually rounded. The walls 22E and 22D are positioned at the right and left ends of the column lower cover 22 in the vehicle-width direction. The walls 22E and 22D extend from the right and left edges of the lower wall 22C toward above the steering column 12. The column lower cover 22 is made of a relatively rigid resin material.

The opening 64 through which the airbag protrudes (refer to FIG. 3) is formed in the lower wall 22C and extends from the right wall 22E to the left wall 22D of the column lower cover 22. The airbag door 60 made of cloth is disposed to cover the opening 64.

As described above, the tear line 62 is formed in the airbag door 60. The tear line 62 is formed by forming slits at predetermined intervals along a straight line. The tear line 62 includes a first tear line 62A, second tear lines 62B, third tear lines 62C, and fourth tear lines 62D. The first tear line 62A extends in the vehicle-width direction at an intermediate position in the vehicle-longitudinal direction in a lower portion of the opening 64 in the lower wall 22C. The second tear lines 62B are continuous with the first tear line 62A. The second tear lines 62B extend in a substantially vehicle-height direction at intermediate positions in the vehicle-longitudinal direction in side portions of the opening 64 in the right and left walls 22E and 22D. The third tear lines 62C extend along border lines (ridge lines) between the lower portion of the opening 64 in the lower wall 22A and the side portions of the opening 64 in the right and left walls 22E and 22D. The fourth tear lines 62D extend in substantially parallel with the third tear lines 62C. That is, the fourth tear line 62D extend along the upper edges of the side portions of the opening 64 in the right and left walls 22E and 22D.

When a predetermined airbag inflation pressure is applied to the airbag door 60, the airbag door 60 is torn along the tear line 62. Thus, as shown in FIG. 3, the airbag door 60 is divided into a front door 60A, a rear door 60B, right doors 60E and 60F, and left doors 60C and 60D. The front door 60A and the rear door 60B open the portion of the opening 64 in the lower wall 22C. The right doors 60E and 60F, and the left doors 60C and 60D open the portions of the opening 64 in the right and left walls 22E and 22D. Thus, the front door 60A and the rear door 60B are opened toward the front and rear, respectively. In addition, the right doors 60E and 60F, and the left doors 60C and 60D are opened toward the right and left, respectively.

As shown in FIG. 4, the base end portion 61 of the airbag door 60 is held back. The held base end portion 61 is embedded in the peripheral portion around the opening 64 in the column lower cover 22 by insert molding.

Next, the advantageous effects obtained in the embodiment will be described.

When a frontal collision occurs (or when it is predicted that a frontal collision will occur), collision detection means (not shown) determines that a frontal collision occurs (or predicts that a frontal collision will occur), and outputs a signal to an airbag ECU. When the airbag ECU determines that airbag devices should be operated, a driver seat airbag device is operated to inflate a driver seat airbag on the steering wheel 34, and the knee airbag device 10 is operated. That is, a predetermined current is supplied to the inflator 50 of the knee airbag device 10, and thus, the inflator 50 is operated. As a result, the inflator 50 generates gas, and the gas is supplied to the knee airbag 52 stored in a folded state, and thus the knee airbag 52 is inflated. When the airbag inflation pressure, which is applied to the airbag door 60 that covers the opening 64 in the column lower cover 22, reaches a predetermined value, the airbag door 60 is torn along the first tear line 62A to the fourth tear lines 62D provided in the airbag door 60. Thus, the front door 60A and the rear door 60B are opened toward the front and rear, respectively. In addition, the right doors 60E and 60F, and the left doors 60C and 60D are opened toward the right and left, respectively. As a result, the knee airbag 52 is inflated and deployed toward an area below the steering column 12, and areas on both sides of the steering column 12. The right and left portions 52B, which are disposed between the instrument panel 14 and the both knees of the occupant, receive and protect the both knees of the occupant.

In the embodiment, the airbag door 60, which is provided in the column lower cover 22, is made of cloth. Therefore, if the airbag door 60, which receives the airbag inflation pressure, is opened, and the rear door 60B, the right rear door 60F, and the left rear door 60D hit the knees of the occupant, the rear door 60B, the right rear door 60F, and the left rear door 60D flexibly bend, and do not strongly press the knees of the occupant. Accordingly, in the embodiment, it is possible to reduce strength of a force by which the airbag door presses the knees of the occupant when the knee airbag 52 is inflated and deployed.

Because a gap between the knees of the occupant and the lower portion of the instrument panel 14 near the column lower cover 22 is generally narrow, the knee airbag 52 needs to be quickly inflated and deployed in the vehicle-width direction when a frontal collision occurs. Therefore, it is preferable that the opening 64 be formed in the lower wall 22C and extends from the right wall 22E to the left wall 22D of the column cover 22, as in the embodiment. However, when the airbag door is formed to cover the opening 64 which is formed in the lower wall 22C and which extends from the right wall 22E to the left wall 22D, the shape of the opened airbag door tends to be long in the vehicle-width direction. As a result, the airbag door is likely to hit the knees of the occupant. However, in the embodiment, because the airbag door 60 is made of cloth, the front door 60B, the right rear door 60F, and the left rear door 60D do not strongly press the knees of the occupant if the front door 60B, the right rear door 60F, and the left rear door 60D hit the knees of the occupant. Accordingly, in the embodiment, it is possible to quickly inflate and deploy the knee airbag 52 in the vehicle-width direction, and to further reduce strength of a force by which an airbag door presses the knees of an occupant.

Further, in the embodiment, the base end portion 61 of the airbag door 60 made of cloth is embedded in the peripheral portion around the opening 64, through the airbag protrudes, in the column lower cover 22 by insert molding. Therefore, when the column lower cover 22 is formed using resin, the resin moves to the base end portion 61 of the airbag door 60, which should be embedded in the column lower cover 22. As a result, the resin firmly attaches to the base end portion 61. Accordingly, it is possible to ensure the strength for supporting the airbag door 60 when the airbag door 60 is opened, without providing, for example, special fixing means for fixing the airbag door 60 to the column lower cover 22. As a result, in the embodiment, it is possible to fix the airbag door 60 to the column lower cover 22 at a predetermined position, without increasing the number of components.

(1) In the above-described embodiment, when a frontal collision occurs, the knee airbag device 10 is operated. However, the invention is not limited to this configuration. A pre-crash sensor may be provided, for example, at the center of a front bumper, and the knee airbag device 10 may be also operated when the pre-crash sensor predicts that a frontal collision will occur.

(2) In the above-described embodiment, the airbag door 60 is made of cloth. However, the invention is not limited to this configuration. The airbag door 60 may be made of any flexible material. Alternatively, the airbag door 60 may be made of a material that is more flexible than a material of which the column lower cover 22 is made. For example, the airbag door 60 may be formed using a film of flexible resin.

(3) In the above-described embodiment, the airbag door 60 is opened toward the front and rear, and right and left. However, the invention is not limited to this configuration. The airbag door 60 may be formed in only the lower wall 22C, and the airbag door 60 may be opened in only one direction, i.e., toward the front or rear. Alternatively, the airbag door 60 may be formed in only the lower wall 22C, and the airbag door 60 may be opened in two directions, i.e., toward the front and rear.

(4) In the above-described embodiment, the base end portion 61 of the airbag door 60 made of cloth is embedded in the column lower cover 22 by insert molding. However, the airbag door 60 may be fixed to the column lower cover 22 using other fixing structures, without using insert molding.

(5) In the above described embodiment, the tear line 62 is formed by forming the slits. However, the tear line 62 may be formed by forming a tear seam, that is, by sewing together the edge portions of the doors (for example, the front door 60A and the rear door 60B) that constitute the airbag door 60 with thread that is likely to be cut, and sewing a portion of the airbag door 60 with thread that is likely to be cut.

(6) In the case where the airbag door 60 is made of flexible resin, the tear line 62 may be a thin portion that is formed by forming a V-shape groove on the rear surface of the airbag door 60.

What is claimed is:

1. A knee airbag device comprising:
    an airbag module that includes a gas generation device that is operated when a collision occurs, and a knee airbag that is stored in a folded state inside a column cover that covers a rear end portion of a steering column, wherein when the knee airbag receives gas from the gas generation device, the knee airbag is inflated and deployed toward a knee of an occupant; and
    an airbag door, provided in a lower portion of the column cover, which is made of a material that is more flexible than a material of which the column cover is made, wherein when the knee airbag is inflated and deployed, the airbag door is opened toward the knee of the occupant due to an airbag inflation pressure,
    wherein the airbag door covers an opening which is formed in a lower wall of the column cover, which extends from the right wall to the left wall of the column cover, and through which the knee airbag protrudes;
    the airbag door is provided in a region such that the airbag door contacts the knee of the occupant when the knee airbag is inflated and deployed; and
    a tear portion is formed in the airbag door, and the tear portion is torn so that a front door and a rear door, which open a lower portion of the opening, are opened toward a front side and a rear side, respectively, and a right door and a left door, which open side portions of the opening, are opened toward a right side and a left side, respectively, when a predetermined airbag inflation pressure is applied to the airbag door.

2. The knee airbag device according to claim 1, wherein the airbag door is made of cloth, and a base end portion of the airbag door is embedded in a peripheral portion around the opening in the column cover by insert molding.

3. The knee airbag device according to claim 1, wherein the tear portion includes:
    a first tear line that extends in a vehicle-width direction at an intermediate position in a vehicle-longitudinal direction in the lower portion of the opening in the lower wall;
    second tear lines that are continuous with the first tear line, and that extend in a substantially vehicle-height direction at intermediate positions in the vehicle-longitudinal direction in side portions of the opening in the right and left walls;
    third tear lines that extend along border lines between the lower portion of the opening in the lower wall and the side portions of the opening in the right and left walls; and
    fourth tear lines that extend substantially parallel with the third tear lines, and that extend along upper edges of the side portions of the opening in the right and left walls.

* * * * *